July 5, 1960 J. DREXLER 2,944,183

INTERNAL CAVITY REFLEX KLYSTRON TUNED BY A TIGHTLY COUPLED EXTERNAL CAVITY

Filed Jan. 25, 1957 3 Sheets-Sheet 1

INVENTOR
J. DREXLER
BY David P. Kelley
ATTORNEY

July 5, 1960

J. DREXLER

INTERNAL CAVITY REFLEX KLYSTRON TUNED BY A TIGHTLY COUPLED EXTERNAL CAVITY 2,944,183

Filed Jan. 25, 1957

3 Sheets-Sheet 2

INVENTOR
J. DREXLER
BY David P. Kelley
ATTORNEY

July 5, 1960
Filed Jan. 25, 1957

J. DREXLER

INTERNAL CAVITY REFLEX KLYSTRON TUNED BY A TIGHTLY COUPLED EXTERNAL CAVITY 2,944,183

INVENTOR
J. DREXLER
BY David P. Kelley
ATTORNEY

United States Patent Office 2,944,183

Patented July 5, 1960

2,944,183

INTERNAL CAVITY REFLEX KLYSTRON TUNED BY A TIGHTLY COUPLED EXTERNAL CAVITY

Jerome Drexler, New Providence, N.J., assignor to Bell Telephone Laboratories, Incorporated, New York, N.Y., a corporation of New York Filed Jan. 25, 1957, Ser. No. 636,261

15 Claims. (Cl. 315—5.46)

This invention relates to ultra high frequency electron discharge devices and more particularly to such devices of the klystron type.

Klystrons have proven to be quite advantageous as devices for use in ultra high frequency applications. However, heretofore the effective tuning range of klystron oscillators by mechanical methods has been limited. Mechanical tuning has been accomplished in the prior art by either changing the capacitive loading of the resonator or by varying the volume of the resonator. In the former method, a flexible diaphragm which permits variations in spacing of the klystron grids is utilized to vary the capacitive loading. This method limits the tuning range to a value of approximately ten percent with a single resonator due to transit time limitations and the failure of the tube to operate if the grids are spaced too closely. More particularly, as the frequency is increased, it would be desirous if the gap spacing could be decreased in order to maintain the optimum transit angle; however, in order to tune the cavity, the gap spacing must actually be increased. Thus, by tuning capacitively the deviation from the optimum transit angle is very rapid. This method of tuning also has the inherent disadvantage that tuning becomes too critical before the failure to produce proper bunching exists. The utilization of a conductive plunger to vary the dimensions of a cavity provides the second basic method for mechanically tuning a klystron. It is by such a method that a secondary cavity directly coupled to the primary cavity is most often tuned.

Disadvantageously, whenever a secondary cavity has been employed in the prior art for tuning purposes, the power output has always been extracted from the secondary resonator. This has been necessary for one main compelling reason. Priorly, a simple iris or aperture has been utilized to couple the primary and secondary resonators. It is well known in the art that the useful range of frequencies over which an oscillator may be tuned by the employment of a secondary resonator is directly proportional to the coefficient of coupling, assuming that the effective Q of the two cavities remains constant. This results from the fact that the lower the external Q or conversely, the higher the coefficient of coupling, the greater will be the percentage of stored energy in the primary cavity over a given frequency band. Since an appreciable amount of stored energy is required in the primary cavity for satisfactory as well as efficient klystron operation, this direct relationship between useful tuning range and coefficient of coupling follows. The degree of coupling achieved by using a simple iris is directly proportional to and mainly dependent on its physical size; therefore the main factor heretofore limiting the degree of coupling has been the physical size of the aperture that may be tolerated without impairing the cavity shape to such a degree that power losses and lowering of efficiency renders the tube inoperative. It thus becomes apparent that, when the maximum amount, of coupling is obtained so as to achieve the greatest tuning range possible, any further removal of the primary cavity wall for providing coupling to the load would be disastrous. It is for this reason that the prior art has had to resort to the secondary cavity as providing a method for coupling to the load since any further removal of the primary cavity would destroy its resonant characteristics.

Having to extract the power output through the secondary resonator results in three inherent disadvantages: first, a second aperture is required in the secondary resonator for coupling to the load which impairs the cavity shape resulting in a lower effective Q and increased power losses. Secondly, optimum coupling between cavities is directly dependent on a constant ratio of stored energy between cavities; thus, since the ratio of stored energy changes drastically as the dimensions of the secondary cavity are varied for tuning purposes, optimum coupling to the load through the secondary cavity cannot continuously be achieved. Thirdly, frequency stability is impaired since the necessity of a low Q secondary cavity results in the primary cavity having only a small percentage of the total stored energy, making it very susceptible to thermal effects. Another difficulty has been encountered priorly when utilizing a simple iris at millimeter wavelengths. As is known in the art, the coefficient of coupling and external Q are directly affected by the thickness of the coupling iris as well as by the physical size of the aperture; if the width is less than one-half the wavelength, which is invariably the case, the magnetic field decays from the primary coupling wall to the secondary coupling wall exponentially. Since the wall thickness required for structural purposes approaches a quarter wavelength at millimeter frequencies, the coupled magnetic field is greatly attenuated in its passage through the iris and, consequently, the coupling coefficient is substantially reduced and, conversely, the external Q substantially increased.

It is, therefore, a general object of this invention to provide an improved mechanical method for increasing the tuning range of a klystron having its primary resonator coupled to the load.

Another object of this invention is to provide a method for increasing the coefficient of coupling and lowering of the secondary external Q from that obtainable by a simple iris in a klystron without necessitating a corresponding increase in the size of the coupling iris.

A further object of this invention is to provide a method of coupling which assures fewer losses and higher circuit efficiency due to the utilization of a relatively small coupling iris.

A still further object of this invention is to provide a method of coupling whereby an internal one-quarter mode primary cavity may be utilized to achieve a tuning range heretofore possible with only a three-quarter mode external cavity and which retains the advantages of internal cavity klystrons regarding efficiency and electronic tuning range.

An additional object of this invention is to provide a method of coupling whereby two symmetrical irises may be utilized in one secondary cavity to tightly couple two distinct primary cavities without destroying the identity of the secondary cavity shape.

A further additional object of this invention is to provide a method of coupling which assures fewer losses and higher circuit efficiency than normally prevalent at millimeter wavelengths due to the excessive wall thicknesses required with respect to the operating wavelength.

These and other objects of this invention are attained in accordance with features of this invention by the utilization of a tunable secondary cavity directly coupled to the primary resonator of a reflex klystron but remote from the power output. A high coefficient of coupling is obtained by enclosing the coupling iris with a material of high dielectric constant. This reduces the susceptance and effectively increases the size of the iris. Accordingly, as is known in the art, when the coefficient of coupling is increased, the external Q of the resonators is correspondingly lowered. Thus, in many high frequency applications, the coefficient of coupling and external Q are used interchangeably, the external Q connoting the degree of coupling in a manner inversely proportional to the coefficient of coupling. The reflex klystron, independent of the tunable secondary cavity, comprises an electron gun assembly, two resonator grids defining the innermost boundaries of the internal resonator and a reflector electrode. Also coupled to the tube, but external is a conventional waveguide output.

The mechanical tuning arrangement may consist of a movable plunger in the secondary resonator. By having a high coefficient of coupling between cavities, which assures that a large percentage of the stored energy will be maintained in the primary cavity, it then becomes possible to tune the tube efficiently over a wide range of frequencies. I have found that the high Q electric circular mode resonant cavity is ideally suited as a secondary resonator. This results in having a cavity with the highest possible internal Q which reduces power losses and assures that the greatest tuning range for a given coefficient of coupling will be obtained.

It is a feature of this invention that a material of high dielectric constant enclose and define the coupling iris which will increase the coefficient of coupling by lowering the susceptance and effectively increasing the size of the iris.

It is a further feature of this invention that a high coefficient of coupling for maximum tuning be obtained with a relatively small iris so that an internal one-quarter mode primary cavity may be coupled to a tunable secondary cavity remote from the power output and achieve a half-power mechanical tuning range many times greater than the same cavity with a simple iris.

It is still a further feature of this invention that a ferroelectric material of high dielectric constant enclose and define the coupling iris for increasing the coefficiency of coupling and with a variable voltage applied thereto providing a method for tuning the tube independent of mechanical means.

A complete understanding of this invention and of these and other features thereof may be gained from a consideration of the following detailed description of the accompanying drawing, in which.

Figure 4:
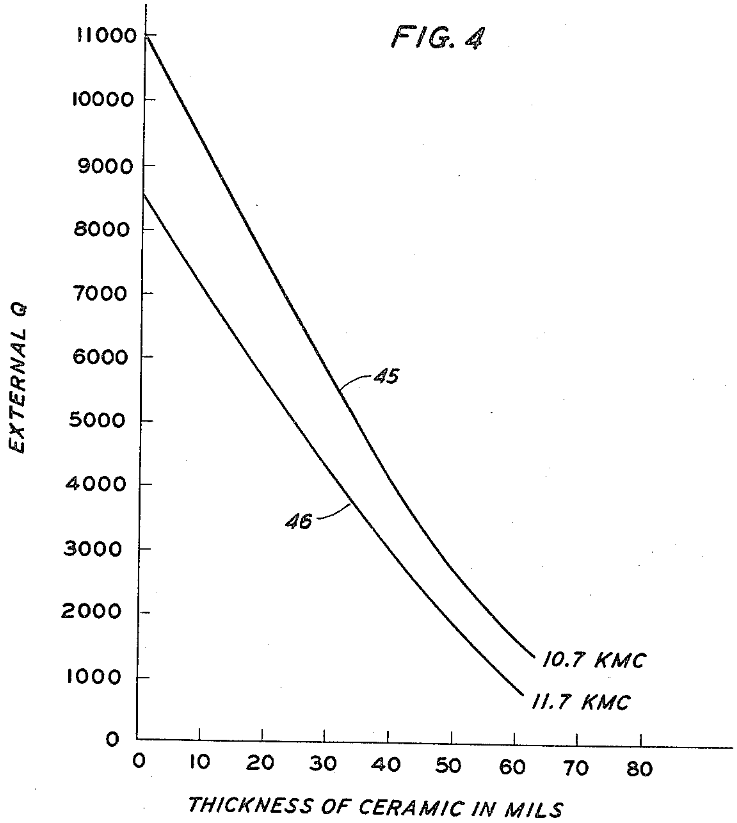
Figure 5:
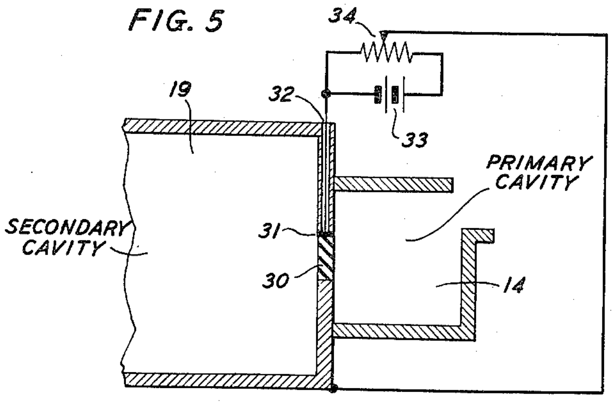

Fig. 4 is a graphical illustration of the external Q as a function of the thickness of the dielectric material defining the coupling iris; and Fig. 5 is a partial schematic representation of a primary and a secondary resonant cavity tightly coupled by an iris containing a ferroelectric material with a biasing voltage applied thereto, in accordance with a further specific illustrative embodiment of this invention.

Figure 1:
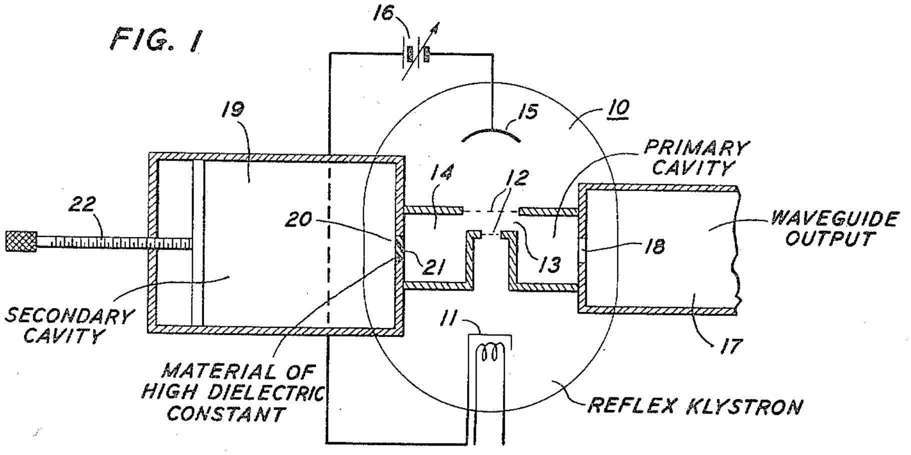
Fig. 1 is a schematic representation of a reflex klystron with a tunable secondary resonator coupled thereto in accordance with one specific illustrative embodiment of my invention.

Referring now more particularly to the drawing, one embodiment of this invention is depicted schematically in Fig. 1 and comprises a reflex klystron 10 having a cathode 11, a repeller electrode 15, and a pair of resonator grids 12 defining a gap 13 across which the electron stream is projected. The variable direct current voltage is applied to the repeller electrode 15 by a source 16. The gap 13 constitutes part of the internal primary resonant cavity 14, as is known in the art. The output cavity 17, which may comprise a conventional waveguide, is coupled to the primary resonant cavity 14 by coupling iris or aperture 18 of suitable dimensions interposed therebetween. In accordance with my invention, a tunable secondary resonant cavity 19 is also coupled to the primary resonant cavity 14 by a second coupling iris or aperture 20, being defined and enclosed by a material of high dielectric constant 21. This material of high dielectric constant reduces the susceptance and effectively increases the size of the iris, thereby permitting a higher coefficient of coupling to be obtained without having to increase the physical size of the iris. A tuning plunger 22 may advantageously be utilized to tune the tube mechanically by varying the dimensions of the secondary cavity; this is well known in the art as "pulling" the tube.

As depicted in Fig. 1 the primary cavity and coupling iris 20 may be both entirely within the evacuated envelope of the tube; however, in other embodiments the iris 20 and a portion of the primary cavity could be external to the tube envelope or the iris 20 could be at the envelope wall, a high dielectric material 21 defining a portion of the envelope and being a high vacuum seal.

Since the theory of operation of reflex klystrons is a well known phenomenon, only a brief description of its operation will be given.

The indirectly heated cathode 11 furnishes a beam of electrons which are projected initially with a uniform average velocity through the resonator grids 12. The electron beam is velocity modulated as it passes between the resonator grids by a radio frequency field which exists between the grids of the primary resonator 14. A retarding electric field established by a negative electron repeller 15 beyond the resonator grids causes the electron beam velocity to decrease to zero and reflects the beam back through the resonator grids. Bunching of the electrons occurs during the transit interval during reflection. Thus, during the first transit, the electrons are velocity modulated, and, by the time they return, the velocity modulation has been converted into current modulation, so that the returning beam drives the resonator and the system is a self-oscillator. In accordance with one desired method of operation, a one-quarter mode internal primary cavity is tightly coupled to a tunable high Q secondary electric circular mode cavity, preferably having an effective Q of at least 10,000; this type of secondary cavity assures a minimum of power losses, increases the maximum tuning range obtainable and enhances stability. In order to achieve the degree of coupling necessary for a wide range of tuning, of the order of ten to twenty percent and still not require a cavity larger than a one-quarter mode primary cavity to accommodate the physical size of the iris required, there is utilized in accordance with my invention a material of high dielectric constant to enclose and define the coupling iris. This material of high dielectric constant may consist of a slab of synthetic sapphire or a derivative thereof, having a dielectric constant of approximately 9. Other materials with a suitable dielectric constant could also be used. By utilizing this material to enclose and define the coupling iris and employing high Q cavities, the frequency of oscillations to the half-power points may be varied over at least a plus or minus eleven percent band in accordance with one embodiment of this invention. Without the ceramic enclosing the coupling iris, the mechanical tuning range to the half-power points with all other factors remaining constant would be reduced to a value of one-third or less. Thus, it is seen that by using this material of high dielectric constant to enclose and define the coupling iris, a one-quarter mode internal primary cavity may be utilized to achieve a mechanical tuning range heretofore never thought possible, and permits the advantages of internal cavity klystrons regarding efficiency and electronic tuning range to be retained.

It should also be emphasized that according to one aspect of this invention, the output is coupled to the one-quarter mode primary cavity rather than the secondary cavity as heretofore required. This permits optimum coupling between cavities for tuning purposes as well as permitting optimum coupling to the load through the primary cavity in an independent manner. This cannot be achieved by using the simple iris of the prior art, even with a three-quarter mode external primary cavity, because of the impairment to the cavity shape by the excessively large coupling iris required for a wide range of tuning. Accordingly, direct coupling to the output from the primary cavity rather than the secondary cavity enhances frequency stability. This results from the fact that a second coupling iris to the load lowers the Q of the secondary cavity. With a low Q secondary cavity, the primary cavity has only a small percentage of the total stored energy and consequently, makes it very susceptible to thermal effects. It should also be noted, that since only a small section of the cavity wall is removed in obtaining tight coupling when the ceramic is used, it is possible to use two irises without destroying the identity of the cavity and thereby makes multiple modes certain. This is a distinct practical advantage as the coupling to the load and to the secondary cavity can be adjusted much more independently.

Figure 2:
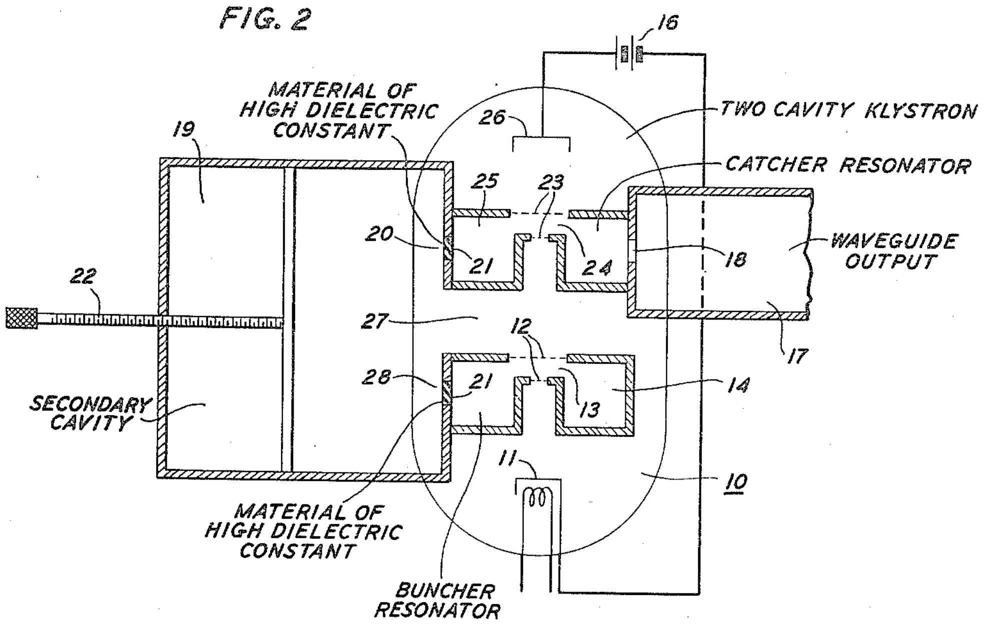
Fig. 2 is a schematic representation of a double resonator klystron having a tunable secondary cavity remote from the power output and directly coupled to both internal cavities in accordance with another specific illustrative embodiment of my invention.

Fig. 2 illustrates another inherent advantage in using a ceramic such as synthetic sapphire or a derivative thereof to increase the coefficient of coupling. Since the physical size of the aperture required for tight coupling is relatively small when a high dielectric ceramic is used, it is possible to use two irises in the tunable secondary cavity without destroying its identity. Accordingly, Fig. 2 schematically depicts a second embodiment of this invention comprising a double resonator klystron 10 having in addition to the elements associated with the reflex klystron depicted in Fig. 1, a drift space 27, output resonator grids 23, defining gap 24, across which the electron stream is projected, output resonator or catcher 25 which includes gap 24, and a collector 26.

In accordance with my invention, a tunable secondary resonator 19 is directly coupled in a symmetrical manner to two primary resonators, buncher resonator 14 and catcher resonator 25 by the utilization of two irises 20 and 28. Due to the presence of a suitable material of high dielectric constant 21 enclosing and defining the coupling irises, the coefficient of coupling may be very high, without necessitating a large physical aperture which would impair the secondary cavity shape. This method of coupling has the distinct advantage over previous methods of mechanical ganged tuning, which either requires varying the volume or changing the capacitive loading of both cavities, by permitting two high Q resonators to be tuned simultaneously and at precisely the exact rate with only one mechanical movement. By utilizing only one tightly coupled secondary resonator for tuning two cavities, a much wider tuning range may be obtained.

Figure 3:
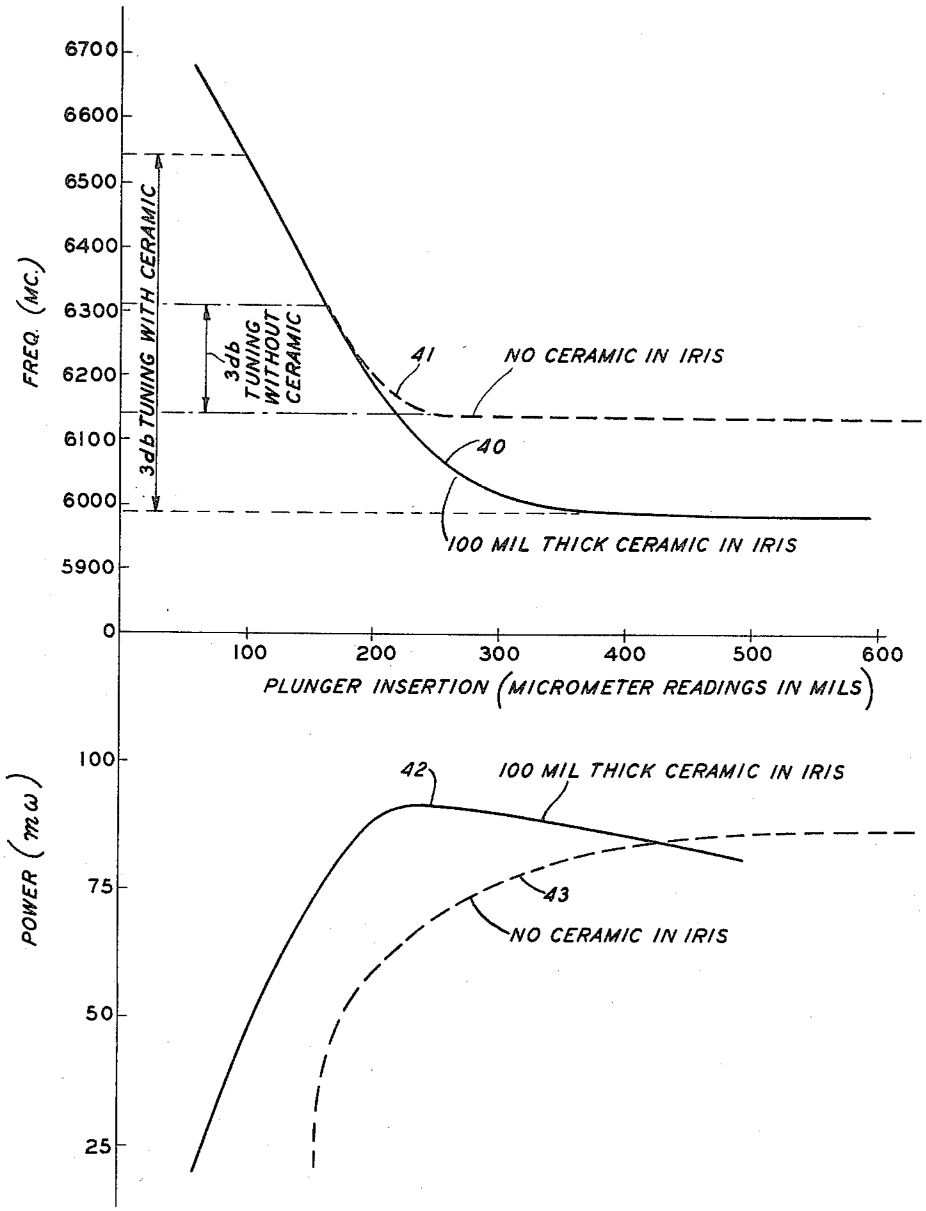
Fig. 3 is a graphical illustration of the tuning range of a reflex klystron oscillator with and without the dielectric material enclosing the iris and with respect to power output.

Fig. 3 illustrates quite vividly the unique benefits derived from the use of a ceramic for increasing the coefficient of coupling and accordingly, the tuning range of a reflex klystron oscillator. The tuning range is plotted with and without a ceramic iris, and with respect to the 3 db or half-power points established by the power versus plunger distance curves 42 and 43 utilizing the same abscissa, namely, plunger distance. In an experimental model substantially the same as depicted in Fig. 1, and having a piece of Almanox 4462 ceramic with a dielectric constant of 8.6 and a thickness of 0.040 inch, defining and enclosing the coupling iris between a one-quarter mode primary cavity and a high Q circular electric mode secondary resonant cavity, a tuning range to the half-power points of plus or minus nine percent was realized at an operating frequency of 6.2 kmc., illustrated by the solid frequency curve 40 of Fig. 3. A greater tuning range could easily be attained with higher Q cavities and a more precisioned plunger than employed in this particular experiment.

The broken frequency curve 41 of Fig. 3 shows the substantial reduction from plus or minus nine percent to a value less than plus or minus three percent for the half-power tuning range of the same tube with all factors remaining constant except the removal of the ceramic enclosing the iris. It is significant to note, that in order to obtain the same tuning range with a simple iris, its size would have to be substantially increased and would necessitate the use of at least a three-quarter mode external primary cavity to accommodate the iris. Even then, as mentioned previously, the power losses would be higher and the effective Q of both cavities lower than for a quarter mode cavity. Further, even though the same range of tuning could be achieved by a larger cavity, it would require the power output to be taken from the secondary cavity, since any additional removal of the primary wall for coupling to the load would destroy the resonant characteristics of the primary cavity.

Fig. 4 exemplifies another unique feature of the dielectric material utilized within the coupling iris in that it lowers the external Q or conversely, increases the coefficient of coupling as the thickness of the dielectric material is increased. As discussed earlier, this is very significant in millimeter wavelength applications where the wall thickness required for structural purposes is not much less than one-half the wavelength at millimeter frequencies. In that case, as known in the art, the coupling characteristics of a simple iris is beyond cut-off and the magnetic field decays exponentially through the wall of the aperture. Consequently, with a simple iris, the coefficient of coupling is substantially lowered and the external Q correspondingly increased in a manner directly proportional to the thickness of the simple coupling iris.

Curve 45 illustrates the range of external Q with a series of slabs of dielectric material having a thickness varying from less than one mil to slightly more than 61 mils at an operating frequency of 10.7 kmc. Curve 46 illustrates the range of external Q for the same pieces of dielectric material but at an operating frequency of 11.7 kmc.

Fig. 5 illustrates a further specific illustrative embodiment of my invention wherein a reflex or double cavity klystron is tuned, with or without the employment of mechanical tuning, by utilizing a ferroelectric material within the coupling iris. This is advantageously made possible since the secondary cavity shape is not restricted by beam coupling considerations. As is known in the art, the dielectric constant of a ferroelectric material changes in a non-linear manner in accordance with variations of a biasing potential applied thereto. Thus, by varying the dielectric constant of a ferroelectric material, the coefficient of coupling is varied and the tube is thereby tuned over a wide range of operating frequencies.

The ferroelectric material 30 may consist of barium titanate for example, or any other reactive ceramic having similar characteristics. Suitable electrical contact to the ferroelectric material may be made by a thin silver coating 31 painted on its top side. A direct current voltage supply 33 with a potentiometer 34 connected in parallel with it furnishes a method for applying a variable dielectric constant potential to the ferroelectric 30 which correspondingly, acts as a variable frequency control. One side of the control potential is introduced through a suitable aperture 32 in the cavity wall while the other side may be connected to the cavity shell at ground potential.

It is to be understood that the specific embodiments described are merely illustrative of the general principles of the present invention. Various other arrangements may be devised in the light of this disclosure by one skilled in the art without departing from the spirit and scope of this invention. For example, in the described embodiments of this invention, a tuning plunger is utilized to mechanically tune the tube. However, it will be apparent to a worker skilled in the art, that a secondary cavity containing a ferrite material could be tuned with a magnetic field, which would not affect the electron beam as seriously as when the ferrite is contained in the primary cavity. Other changes may also appear to one skilled in the art.

What is claimed is:

1. An electron discharge device of the klystron type comprising means for projecting a stream of electrons, a resonant cavity having a pair of electron-permeable members forming a portion of the walls thereof and positioned in the path of said stream of electrons, means for extracting output power from said resonant cavity, means for tightly coupling an external secondary resonant cavity to said first-mentioned resonant cavity remote from the power output, said last-mentioned means including a coupling iris of a high dielectric constant material, and means for tuning said secondary resonant cavity to vary the frequency of said discharge device.

2. An electron discharge device in accordance with claim 1 further comprising mechanical means for varying the dimensions of said secondary resonant cavity to tune said discharge device over a wide range of frequencies.

3. An electron discharge device in accordance with claim 1 wherein said coupling iris comprises a ferroelectric material of high dielectric constant, and means for applying to said ferroelectric material a biasing voltage to vary the coefficient of coupling and correspondingly tune said discharge device.

4. An electron discharge device in accordance with claim 1 further comprising a second resonant cavity positioned in the path of said stream of electrons and means for tightly coupling said second resonant cavity to said external secondary resonant cavity, said means including a second coupling iris of a high dielectric constant material.

5. An electron discharge device in accordance with claim 4 wherein said second coupling iris comprises a ferroelectric material of high dielectric constant, and means for applying to said ferroelectric material a biasing voltage to vary the coefficient of coupling and correspondingly tune said discharge device.

6. An ultra high frequency discharge device of the klystron type comprising means for projecting an electron stream, electrode means in juxtaposition in the path of said electron stream, said electrode means defining a gap, a resonant cavity including said gap, means for tightly coupling an external secondary resonant cavity to said first-mentioned resonant cavity, said last-mentioned means including a coupling iris of a high dielectric constant material to increase the coefficient of coupling and lower the external Q of said external secondary resonant cavity, and means for mechanically varying the dimensions of said external secondary resonant cavity to tune said discharge device over a wide range of frequencies.

7. An ultra high frequency discharge device in accordance with claim 6 further comprising output means connected to said first-mentioned resonant cavity and remote from said external secondary resonant cavity.

8. An ultra high frequency discharge device in accordance with claim 6 further comprising second electrode means in juxtaposition in the path of said electron stream, said second electrode means defining a second gap, a second resonant cavity including said second gap, means for tightly coupling said external secondary resonant cavity to said second resonant cavity, said last-mentioned means including a second coupling iris of a high dielectric constant material symmetrically displaced with respect to said first coupling iris in said external secondary resonator, and output means connected to said second resonant cavity and remote from said external secondary resonant cavity.

9. An ultra high frequency discharge device in accordance with claim 8 wherein said external secondary resonant cavity comprises a circular electric mode resonant cavity with an effective Q in excess of 10,000, and said first-mentioned resonant cavity and said second resonant cavity comprise internal one-quarter mode resonant cavities.

10. An electron discharge device of the reflex oscillator type comprising means for producing a stream of electrons, a first cavity resonator having a pair of electron-permeable grids forming the innermost portions of adjacent cavity walls and positioned in the path of said stream of electrons, a repeller electrode opposite said electron projecting means, means for applying a direct current voltage to said repeller electrode, output means connected to said first cavity resonator, means for tightly coupling a second cavity resonator to said first cavity resonator and remote from the power output, said last-mentioned means including a coupling iris of a high dielectric constant material to increase the coefficient of coupling and lower the external Q of said secondary cavity resonator, and mechanical means for varying the dimensions of said secondary cavity resonator to tune said discharge device over a wide range of frequencies.

11. An electron discharge device in accordance with claim 10 wherein said first cavity resonator comprises a one-quarter mode cavity resonator and said secondary cavity resonator comprises a waveguide resonant cavity.

12. An electron discharge device in accordance with claim 10 wherein said first cavity resonator comprises an internal one-quarter mode cavity resonator and said second cavity resonator comprises a circular electric mode cavity resonator having an effective Q in excess of 10,000, and said coupling iris comprises a material having a dielectric constant in excess of 8.

13. A multicavity discharge device of the klystron type comprising means for producing an electron stream, an input cavity resonator having a pair of resonator grids forming a portion of the walls thereof and positioned in the path of said electron stream, an output resonator having a pair of resonator grids forming a portion of the walls thereof and positioned in the path of said electron stream, said input and said output resonators defining a drift space therebetween, output means connected to said output cavity resonator, a collector electrode opposite said electron projecting means, means for tightly coupling a single secondary resonator to said input and output resonators, said last-mentioned means including symmetrically displaced coupling irises of high dielectric constant material in said secondary resonator, and means for varying the dimensions of said secondary resonator to tune said input and output resonators simultaneously and at precisely the same rate with one mechanical movement over a wide range of frequencies.

14. A multicavity discharge device in accordance with claim 13 wherein said input and output cavity resonators comprise internal one-quarter mode resonators and said secondary cavity resonator comprises a circular electric mode resonator with an effective Q in excess of 10,000.

15. A multicavity discharge device in accordance with claim 14 wherein said coupling iris of high dielectric constant material comprises a ferroelectric material, and means for applying a biasing voltage to said ferroelectric material to vary the coefficient of coupling and correspondingly tune said discharge device.

References Cited in the file of this patent

UNITED STATES PATENTS 2,304,540 Cassen ---------------- Dec. 8, 1942

(Other references on following page)

UNITED STATES PATENTS

| | | |
|---|---|---|
| 2,508,479 | Wheeler | May 23, 1950 |
| 2,523,841 | Nordsieck | Sept. 26, 1950 |
| 2,658,165 | Evans et al. | Nov. 3, 1953 |
| 2,773,246 | Brook | Dec. 4, 1956 |
| 2,789,250 | Varian et al. | Apr. 16, 1957 |
| 2,790,928 | Reed | Apr. 30, 1957 |
| 2,806,977 | Carter, Jr. | Sept. 17, 1957 |
| 2,853,646 | Geisler, Jr. | Sept. 23, 1958 |

FOREIGN PATENTS

| | | |
|---|---|---|
| 1,108,985 | France | Sept. 14, 1955 |